F. AUMANN.
SPARE TIRE CARRIER.
APPLICATION FILED DEC. 20, 1920.
1,401,031.
Patented Dec. 20, 1921.
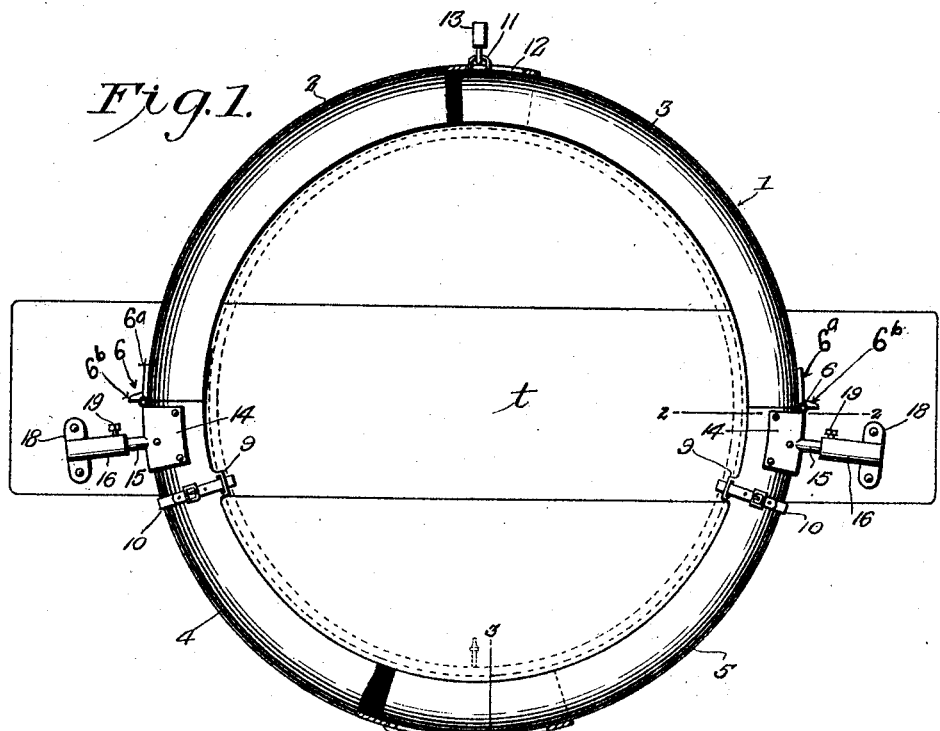
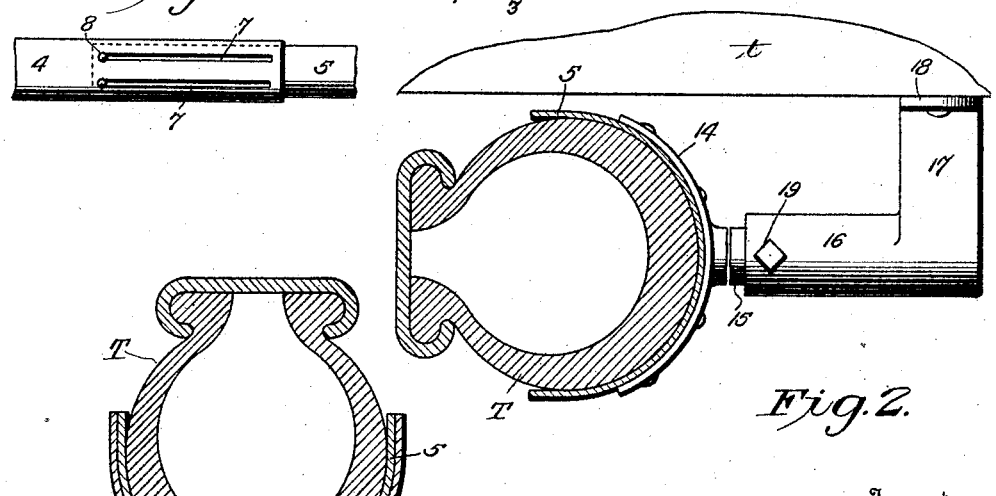
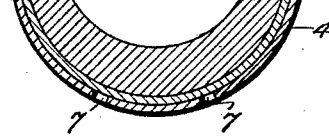
Inventor
Frank Aumann,
By
Geo. P. Kimmel, Attorney

UNITED STATES PATENT OFFICE.

FRANK AUMANN, OF MANITOWOC, WISCONSIN.

SPARE-TIRE CARRIER.

1,401,031.

Specification of Letters Patent.  Patented Dec. 20, 1921.

Application filed December 20, 1920. Serial No. 431,939.

*To all whom it may concern:*

Be it known that I, FRANK AUMANN, a citizen of the United States, residing at Manitowoc, in the county of Manitowoc, in the State of Wisconsin, have invented certain new and useful Improvements in a Spare-Tire Carrier, of which the following is a specification.

This invention relates to carriers or holders for spare tires for automobiles and the like.

The object of the invention is to provide a tire holder or carrier so constructed as to perform the double function of a tire holder and cover and which is made of sections adjustably connected to adapt it for use with tires of varying sizes.

Another object is to provide a sectional carrier of this character in which the sections are adjustably and inseparably connected to vary the size of the holder.

Another object is to provide adjustable means for connecting the carrier to a support to permit variation in the size of the carrier.

With these and other objects in view, the invention consists in certain novel features of construction as hereinafter shown and described, and specifically pointed out in the claims.

In the accompanying drawing:

Figure 1 represents a side elevation of a carrier embodying this invention shown applied.

Fig. 2 is a transverse section taken on the line 2—2 of Fig. 1.

Fig. 3 is a similar view taken on the line 3—3 of Fig. 1, and,

Fig. 4 is a detail plan view of a portion of the holder.

The carrier constituting this invention is shown in the form of a casing 1 composed of a plurality of hollow segments 2, 3, 4 and 5, said segments being constructed of any suitable metal capable of supporting the weight of the casing to be carried thereby. The upper segments 2 and 3 are hingedly connected at one end as at 6 to the lower segments 4 and 5 which latter are telescopically engaged and have a pin and slot connection to provide for their adjustment to adapt the carrier to fit tires of different sizes. As shown the segment 5 is equipped with transversely spaced and alined headed studs 8 which pass through transversely spaced longitudinally disposed slots 7 formed in the perimeter of segment 4 as is shown clearly in Figs. 1, 3 and 4 to provide for the expansion and contraction of the segments. The upper segments 2 and 3 are also telescopically engaged with each other and one carries a staple 11 on its free end which passes through a longitudinally disposed slot 12 in the outer wall of the free end of segment 2 as is shown clearly in Fig. 1, a padlock 13 being designed to be engaged with the staple 11 to hold the segments in closed operative position.

The lower segments 4 and 5 are each equipped with a pair of transversely alined slotted ears as 9 carried by their inner edges and designed to receive straps 10 which assist in retaining the tire T in the holder.

Means for mounting the carrier on a support are shown in the form of adjustable brackets connected with the segments 4 and 5 at their hinged connection with segments 2 and 3. These brackets are exactly alike and hence one only will be described in detail. Each bracket comprises a transversely curved plate 14 to fit the outer face of the segment to which it is to be applied and which is secured thereto by riveting or otherwise and which also forms one member of the hinge 6, the other member 6ª of the hinge being fixed to the adjacent section end and provided with a stop 6ᵇ to limit the opening movement of said section. This plate 14 has a stub shaft 15 projecting radially therefrom and which is designed to enter and slidably engage a sleeve 16 carried by a laterally extending arm 17 on a plate 18 which plate is riveted or otherwise fixedly mounted on a support, said support being here shown in the form of a gasolene tank *t*, but obviously it may be mounted on any other suitable part of the vehicle. The supports 16 are positioned at an oblique angle as shown in Fig. 1 to adapt them to longitudinally receive and support the strain exerted by the carrier and more particularly by the sections 1 and 2 when the latter are open. This oblique arrangement of the sleeves 16 also connect the stub shafts 15 to slide freely in and out of said sleeves when the carrier is collapsed or drawn out, preventing all possibility of binding of the stub shafts within the sleeves.

The stub shafts 15 are of a length to permit them to slide in the sleeves 16 to provide for the variation in size of the carrier and yet prevent them from being removed from said sleeve and they are secured in adjusted position by set screws 19.

The width of the hollow segments from which this carrier is constructed is sufficient to incase the greater portion of the tire to be carried thereby and protect it against the weather and when it is desired to remove it the padlock 13 is unlocked and the sections 2 and 3 swung open, the straps 10 released and the tire may then be lifted out of the holder and another put in its place if desired.

The preferred embodiment of the invention is disclosed in the drawings and set forth in the specification, but it will be understood that any modifications within the scope of the claimed invention may be made in the construction without departing from the principle of the invention or sacrificing any of its advantages.

What is claimed is:

1. A spare tire carrier comprising a casing composed of a plurality of hollow segments substantially semi-circular in cross section, some of said segments being slidably and inseparably connected with each other and hingedly connected with others, means for detachably connecting the free ends of the hinged sections, and means for mounting the carrier on a support.

2. A spare tire carrier comprising a casing composed of a plurality of hollow segments semi-circular in cross section, some of said segments having a headed stud and slot connection with each other to provide for the expansion and contraction to fit tires of various sizes and to prevent their separation, said last mentioned segments being hingedly connected with others, the free ends of said hinged sections having means for detachably connecting them.

3. A spare tire carrier comprising a casing composed of a bottom section formed of hollow segments slidably connected at their meeting ends and held against separation, a top section composed of two segments hinged to the opposed ends of the bottom section, the free ends of the segments of the top section having interlocking elements to detachably connect them and to receive a padlock for securing them in engaged position.

4. The combination with a tire holder; of a mounting therefor comprising bracket members fixed on the holder, and coöperating bracket members to be mounted at an oblique angle on a support, one of said members having a socket and the other a stub shaft to slidably engage the socket, said stub shaft carried members being adapted to be mounted at an oblique angle relatively to the carrier to prevent binding of said shafts in said sockets when the carrier is expanded or contracted.

In testimony whereof, I affix my signature hereto.

FRANK AUMANN.